INVENTOR.
WILLIAM H. DuBOIS
BY
ATTORNEY

April 12, 1955     W. H. DU BOIS     2,706,018
AIRPLANE WHEEL AND BRAKE ASSEMBLY
Filed Nov. 10, 1949     2 Sheets-Sheet 2

INVENTOR.
WILLIAM H. DUBOIS
BY
ATTORNEY

United States Patent Office 2,706,018
Patented Apr. 12, 1955

2,706,018

AIRPLANE WHEEL AND BRAKE ASSEMBLY

William H. DuBois, South Bend, Ind., assignor to Bendix Aviation Corporation, South Bend, Ind., a corporation of Delaware Application November 10, 1949, Serial No. 126,593

9 Claims. (Cl. 188—72)

The present invention relates to an airplane wheel and brake assembly, and more particularly to a wheel and brake assembly which is capable of delivering more braking capacity than a conventional assembly of the same size.

The primary object of the present invention is to provide a narrower airplane wheel and brake assembly than the conventional design capable of delivering the same performance. Among the many reasons for such an object is the one facilitating retraction of the assembly in the airplane wing sections.

Another object of the present invention is to provide an airplane wheel and brake assembly in which dual brakes are operable by a single actuator. The achieving of this object reduces the number of parts as well as conduces to a narrow assembly.

Another object of the present invention is to provide an assembly of the type mentioned above in which the brake actuator is of the hydraulic type and rotates with the wheel.

Still another object is to provide an assembly of the above type in which a part of the wheel is utilized as a part of the brake assembly thereby reducing the number of separate brake parts and the width of the assembly.

Other objects will become obvious as the description proceeds.

Figure 1:
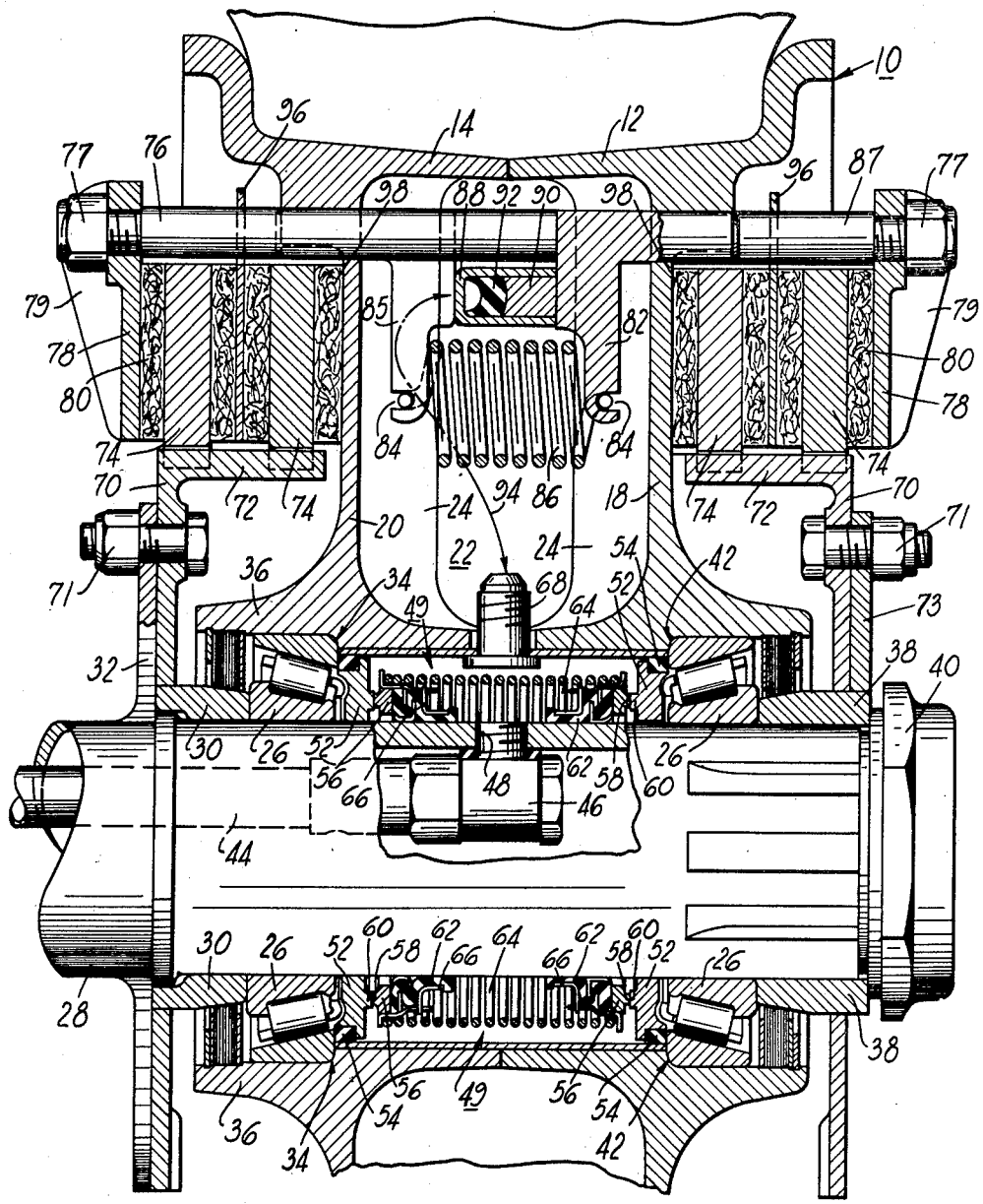
Figure 1 is a partial axial section of an embodiment of the present invention.

Referring more particularly to Figure 1 of the drawings, a wheel 10 of box-shaped cross-section is comprised of a pair of allochiral wheel sections 12 and 14 secured together by means of a plurality of circumferentially spaced bolts 16 received through companion openings in the wheel side plates 18 and 20. These side plates are offset inwardly from the outside edges of the wheel in such a manner as to form an annular chamber 22 which houses the brake actuating mechanism to be described hereinafter. Side plates 18 and 20 are provided with angularly spaced strengthening ribs 24 which radiate from the hub of the wheel 10.

A pair of spaced bearings 26 rotatably support the wheel 10 on the stationary axle 28 secured in any conventional manner to the aircraft. The left hand bearing 26 is held against axial movement by spacing ring 30 which abuts against a flange 32 on axle 28 and the shoulder 34 on the hub 36. The right hand bearing is similarly held in position by means of the spacing ring 38 abutting on the right against the hub nut 40 threadedly received on the end of axle 28, and the shoulder 42 of hub 36.

A fluid pressure conduit 44 resides inside axle 28 and terminates in a fitting 46 having an outlet which registers with an opening 48 in the axle 28. This opening 48 leads into an annular fluid pressure chamber 49, constituting a fluid connection, which is formed between the outer surface of axle 28, and the inner surface of hub 36, which is formed by wheel sections 12 and 14. The ends of this chamber are constituted by a pair of annular bearing members 52 which abut against respective bearings 26. Since these bearing members 52 preferably rotate with the wheel, annular rubber members 54 are wedged between the respective bearings and the wheel to make a connection whereby such rotation is achieved.

Non-rotatable annular bearing members 56, surrounding axle 28, are formed with annular projections 58 which engage respective similar projections 60 on the rotatable bearing members 52 to form a fluid seal therebetween. To insure against fluid leakage around the axle 28, a pair of rubber sealing rings 62 are stretched around axle 28 with each being pressed against the respective stationary bearing member 56 by one of a pair of retainer rings 66 acted upon by a compression spring 64. A fluid swivel fitting is thus achieved whereby fluid pressure from conduit 44 may be communicated with a rotating actuator on wheel 10. An outlet for this swivel fitting rotatable with wheel 10 is designated by reference numeral 68.

Inasmuch as the brake assembly on the left hand side of the wheel is the same as that on the right hand side, only the left hand assembly will be described, like numerals indicating like parts, except where indicated otherwise.

The brake assembly comprises a carrier or torque-taking member 70 secured by any conventional means to a stationary part of the vehicle, but which, in the present embodiment, is shown secured to axle flange 32 by means of a plurality of circumferentially spaced bolts 71. The carrier 70 on the outboard side of the wheel is secured to a disc 73 suitably mounted against movement on axle 28. The stator 70 has a cylindrical key portion 72 adapted to receive thereon a pair of stator friction or disc brake elements 74 which are held against rotation but allowed to move axially of the wheel 10. A plurality of pressure transmitting members or pins 76, defined in the appended claims as a "set" of pins, are received in circumferentially spaced openings in side plates 18 and 20 near the outer periphery of wheel 10. These pins 76 are capable of reciprocating movement and are illustrated as being held in planes which include the axis of the wheel 10. The pins 76 carry on their left ends by means of the nuts 77 a pressure plate or rotatable brake element 78 provided with conventional brake lining 80. This pressure element 78 is preferably of annular form and is strengthened by circumferentially spaced ribs 79. The right hand ends of the pins 76 protrude only a short distance through the side plate 18, so as not to interfere with the operation of the brake assembly on the right hand side of the wheel.

Figure 2:
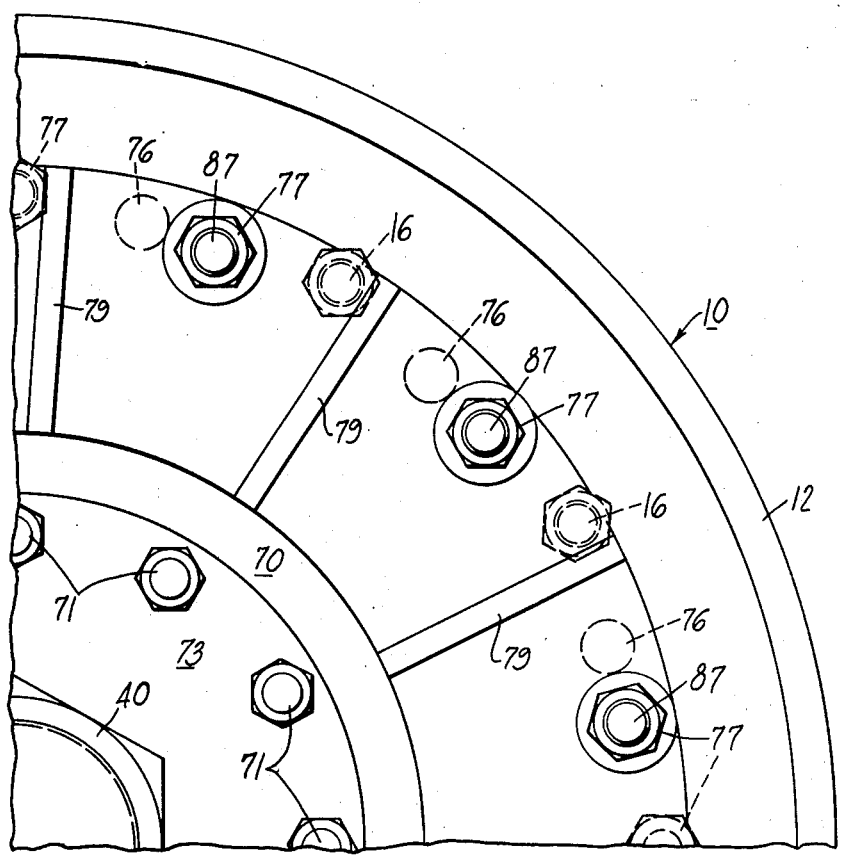
Figure 2 is a partial side elevation thereof.
Figure 3:
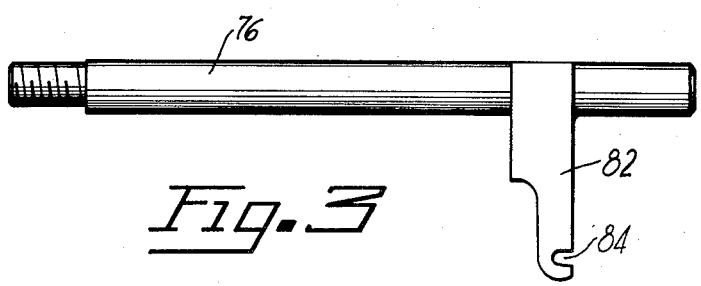
Figure 3 is a detailed view of one of the brake pressure transmitting members.

Secured to each pin 76 between the ends thereof and preferably formed integral therewith, is a radially inwardly projecting applying member 82 provided on its inner end with a notch 84 for receiving a loop of one end of return spring 86, each return spring being connected at its other end to a similar applying member 85 which is carried by a pin 87 (identical to a pin 76) running to the brake on the right hand side of the wheel. As viewed in Figure 2, pins 76 and 87 are arranged in alternate circumferential order with pins 76 projecting from the left side of the wheel and pins 87 from the right side.

Carried between the applying members 82 and 85 is an annular hydraulic actuator constituted by a cylinder 88 and a piston 90, the closed end of cylinder 88 abutting against applying members 85 and the piston 90 abutting against applying members 82. A sealing member 92 is seated on the head of piston 90 to prevent the leakage of pressure fluid therearound. Any method of securing cylinder 88 in position may be used without departing from the scope of this invention. A fluid connection 94, shown in diagram, is provided between the fitting 68 and the cylinder 88. Now it is seen that fluid pressure in the conduit 44 may be communicated to the cylinder 88 by means of the swivel fitting 49 previously described.

A rotatable friction or disc brake element 96, which carries brake lining segments on each side thereof, is keyed to pin 76 for axial movement thereon; and to utilize the wheel itself as a rotatable friction or brake element, a lining segment 98 is secured to the side 20 to be engaged by a stator brake element 74. Likewise, a lining segment 98 is secured to side 18.

In operation, fluid pressure is transmitted through conduit 44, swivel fitting 49, fluid connection 94, to the head of the piston 90, whereupon cylinder 88 and piston 90 are forced apart, cylinder 88 forcing applying members 85 and pressure transmitting pins 87 to the left, and piston 90 forcing applying members 82 and pins 76 to the right. This action obviously draws the two pressure plates 78 inwardly, or toward each other to compress the respective brake elements against the linings 98. In release of the brakes, the fluid pressure in conduit 44 is relieved and return springs 86 draw the applying members 82 and 85 together, moving the pressure plates 78 apart out of frictional engagement with the respective stator brake elements.

This design, which utilizes a single actuator for dual brakes instead of a pair of actuators for dual brakes, obviously provides for a narrower construction inasmuch as the space formerly occupied by the second actuator is no longer needed. The side plates of the wheel itself are utilized as brake elements, thereby eliminating the parts from the brakes normally indentified as the backing plates. This obviously reduces the over-all width of the assembly. Further, the space between the wheel sides houses the actuator, whereas heretofore this space was not so utilized, and the actuator placed in the assembly where it added to the width thereof.

Since each of the brakes are mounted on the outside of the wheel, it is obvious that as the wheel is transported, cooling currents of air will be forced directly onto the brakes to carry away the heat energy generated by brake application. This cooling effect obviously adds to the capacity of the brake.

Although only one embodiment of the invention has been illustrated and described, various changes in the form and relative arrangements of the parts may be made to suit requirements.

I claim:

1. An airplane wheel and brake assembly comprising a hollow stationary axle member, a fluid conduit extending into said axle member, a pair of spaced bearings on said axle member held against lateral movement, a split wheel of substantially box-shaped cross-section having a rim and a hub and being carried on said bearings, an annular fluid-containing chamber located between said bearings and bounded by the inner surface of the hub of said wheel and the outer surface of said axle member, said chamber communicating with said conduit; the rim of said wheel extending outwardly at both sides to form two brake cavities, two stator members held against rotation, one disposed in each of said brake cavities, each of said stator members having one or more disc brake elements keyed thereon for axial movement, a plurality of axially-extending circumferentially spaced actuator pins reciprocable in openings in the sides of said wheel, two rotatable brake pressure elements, one on each side of said wheel cooperatively associated with corresponding disc brake elements, one brake pressure element being carried by some of said pins, the other brake pressure element carried by the other of said pins, radially converging applying members disposed between the sides of said wheel and carried by said pins, a hydraulic actuator operatively connected to said applying members whereby said brake pressure elements may be simultaneously forced inwardly to apply the brakes, return spring means carried by said applying members urging them in a direction to release the brakes, rotatable disc brake elements carried by said wheel cooperatively associated with said aforementioned brake elements, the sides of said wheel serving as brake elements, and conduit means communicating with the outlet of said annular fluid chamber and said hydraulic actuator.

2. An airplane wheel and brake assembly comprising a hollow stationary axle member, a fluid conduit extending into said axle member, a pair of spaced bearings on said axle member held against lateral movement, a split wheel of substantially box-shaped cross-section having a rim and a hub and being journaled on said bearings, an annular fluid-containing chamber located between said bearings and bounded by the inner surface of the hub of said wheel and the outer surface of said axle member, said chamber communicating with said conduit, the rim of said wheel extending outwardly at both sides to form two brake cavities, two torque-taking members held against rotation, one mounted in each of said cavities, two brakes, one disposed in each cavity and constituted by one or more non-rotatable disc brake elements carried for axial movement on each torque-taking member, one or more disc brake elements carried on each side of said wheel to rotate therewith and adapted to be moved axially, and two pressure plates one for each cavity rotatable with said wheel and movable to frictionally compress the respective rotatable and non-rotatable brake elements against the corresponding side of said wheel, pressure transmitting means connected to each pressure plate and extending into the central portion of said wheel between the rim and hub thereof, a hydraulic actuator operably associated with said pressure transmitting means to apply the brakes, and conduit means connecting said actuator with said annular chamber.

3. An airplane wheel and brake assembly comprising a hollow stationary axle member, a fluid conduit extending into said axle member, a pair of spaced bearings on said axle member held against lateral movement, a split wheel having a rim and spaced sides and being carried on said bearings, an annular fluid-containing chamber located between said bearings and said wheel, communicating with said conduit, the rim of said wheel extending outwardly at both sides to form two brake cavities, two stator members held against rotation, one mounted in each of said cavities, each of said stator members having non-rotatable disc brake elements keyed thereon for axial movement a plurality of circumferentially spaced actuator pins reciprocable in openings in the sides of said wheel, two rotatable brake pressure elements, one on each side of said wheel and cooperatively associated with corresponding disc brake elements, one brake pressure element being carried by some of said pins, the other brake pressure element being carried by the other of said pins, radially converging applying members disposed between the sides of said wheel and carried by said pins, a hydraulic actuator operatively connected to said applying members whereby said brake pressure elements may be simultaneously forced inwardly to apply the brakes, return spring means carried by said applying members urging them in a direction to release the brakes, rotatable lined disc brake elements carried by said wheel and cooperatively associated with said non-rotatable disc brake elements, means for holding said wheel in position on said axle, and conduit means communicating fluid from said annular fluid chamber to said hydraulic actuator.

4. An airplane wheel and brake assembly comprising a hollow stationary axle member, a fluid conduit extending into said axle member, a split wheel having spaced sides journaled on said axle, an annular fluid-containing chamber located between said wheel and said axle member and communicating with said conduit, two stator members held against rotation, one mounted on each side of said wheel, said stator members having one or more non-rotatable disc brake elements keyed thereon for axial movement, a plurality of circumferentially spaced actuator pins reciprocable in openings in the sides of said wheel, two rotatable brake pressure elements, one on each side of said wheel and being cooperatively associated with corresponding disc brake elements, one brake pressure element being carried by some of said pins, the other brake pressure element being carried by the other of said pins, radially converging applying members disposed between the sides of said wheel and being carried by said pins, a hydraulic actuator operatively connected to said applying members whereby said brake pressure elements may be simultaneously forced inwardly to apply the brakes, return spring means carried by said applying members urging them in a direction to release the brakes, rotatable lined disc brake elements carried by said wheel and being cooperatively associated with said non-rotatable disc brake elements, means for holding said wheel in position on said axle, and conduit means communicating with said annular fluid-containing chamber and said hydraulic actuator.

5. An airplane wheel and brake assembly comprising a wheel having spaced side plates, two torque-taking members, one for each side of said wheel adapted to be held against rotation, one or more non-rotatable brake elements carried on each torque-taking member, a plurality of circumferentially spaced brake pressure transmitting members reciprocably carried in the side plates of said wheel near the outer periphery thereof, alternate pressure transmitting members carrying a brake pressure plate on one side of the wheel and the other pressure transmitting members carrying a brake pressure plate on the other side of the wheel, each pressure plate being lined with friction material on its inner side, said pressure transmitting members carrying radially converging applying members disposed between the side plates of said wheel, the applying members of the pressure transmitting members carrying the left hand pressure plate being disposed near the right hand side plate and the applying members for the other pressure transmitting members being disposed near the left hand side plate, a hydraulic actuator carried between the right and left hand applying members for spreading same apart, resilient means connecting the right hand applying members to the left hand applying members urging them together, friction lining material carried on the outer side of each side plate of said wheel, and one or more lined rotatable brake elements carried on each side of said wheel cooperable with the respective aforementioned brake elements and said pressure plates whereby actuation of said actuator will cause said pressure plates to be drawn inwardly to compress the respective brake elements against the corresponding lined side of said wheel.

6. An airplane wheel and brake assembly comprising a wheel having spaced side plates, a torque-taking member for each side of said wheel adapted to be held against rotation, one or more non-rotatable brake elements carried on each torque-taking member, a plurality of circumferentially spaced brake pressure transmitting members reciprocably carried in the side plates of said wheel near the outer periphery thereof, some pressure transmitting members carrying a brake pressure plate on one side of the wheel and the other pressure transmitting members carrying a brake pressure plate on the other side of the wheel, each pressure plate being lined with friction material on its inner side, each of said pressure transmitting members having an applying member disposed between the side plates of said wheel, the applying members of the pressure transmitting members carrying the left hand pressure plate being disposed near the right hand side plate and the applying members for the other pressure transmitting members being disposed near the left hand side plate, a hydraulic actuator carried between the right and left hand applying members for spreading same apart, resilient means connecting the right hand applying members to the left hand applying members urging them together, friction lining material carried on the outer side of each side plate of said wheel, and one or more lined rotatable brake elements carried on each side of said wheel cooperable with the aforementioned brake elements and said pressure plates whereby actuation of said actuator will cause said pressure plates to be drawn inwardly to compress the respective brake elements against the corresponding lined side of said wheel.

7. An airplane wheel and brake assembly comprising a wheel having spaced supporting sides, two torque-taking members extending from the central portion of the wheel toward the rim, one of said members being mounted on each side of said wheel and adapted to be held against rotation; a brake disposed on each side of said wheel and constituted by one or more non-rotatable disc brake elements carried for axial movement on each torque-taking member, one or more disc brake elements carried on each side of said wheel to rotate therewith and adapted to be moved axially, and two pressure plates rotatable with said wheel and movable to cause frictional engagement of the rotatable and non-rotatable brake elements, and actuating means acting on each pressure plate and embodied in both of said sides between the wheel rim and hub, said actuating means having parts movable axially toward the central plane of said wheel to move both said pressure plates in a direction to cause frictional engagement of said brake elements.

8. An airplane wheel and brake assembly comprising a wheel having spaced side plates, a torque-taking member for each side of said wheel adapted to be held against rotation, one or more non-rotatable brake elements carried on each torque-taking member, brake pressure transmitting means carried in the side plates of said wheel near the outer periphery thereof, part of the pressure transmitting means carrying a brake pressure plate on one side of the wheel and the other part of the brake transmitting means carrying a brake pressure plate on the other side of the wheel, each of said parts of said pressure transmitting means having an applying member disposed between the side plates of said wheel, the applying members of the pressure transmitting means carrying the left hand pressure plate being disposed near the right hand side plate and the applying members for the other pressure transmitting means being disposed near the left hand side plate, the hydraulic actuator carried between the right and left hand applying members for spreading same apart, and one or more rotatable brake elements carried on each side of said wheel cooperable with the aforementioned brake elements and said pressure plates whereby actuation of said actuator will cause said pressure plates to be drawn inwardly to compress the respective brake elements against the corresponding side of said wheel.

9. An airplane wheel and brake assembly comprising a wheel having spaced supporting sides, torque-taking means arranged to be held against rotation, a brake for one of said sides and constituted by one or more non-rotatable disc brake elements carried for axial movement on said means, one or more rotatable disc brake elements carried by said wheel and adapted to be moved axially for frictional engagement with said non-rotatable brake elements, a pressure plate rotatable with said wheel, a reaction member held against axial movement and being located nearer the axial center of said wheel than said pressure plate, said pressure plate being mounted for axial movement to frictionally press said brake elements against said reaction member, both said pressure plate and said reaction member being lined with composition friction material having heat-insulating properties, said one wheel side serving as an operating part of said brake, and fluid pressure actuating means rotatable with said wheel and at least partially carried by said one wheel side and actuable in a direction toward the central plane of said wheel to move said pressure plate in the same direction to cause frictional engagement of said brake elements and said reaction member.

References Cited in the file of this patent

UNITED STATES PATENTS

| Number | Name | Date |
|---|---|---|
| 1,748,827 | Boltshauser | Feb. 25, 1930 |
| 1,977,981 | Bates | Oct. 23, 1934 |
| 2,006,387 | Eksergian | July 2, 1938 |
| 2,313,223 | Frank | Mar. 9, 1943 |
| 2,318,880 | Mueller | May 11, 1943 |
| 2,393,010 | Arnold | Jan. 15, 1946 |
| 2,464,538 | Vanderzee | Mar. 15, 1949 |

FOREIGN PATENTS

| Number | Country | Date |
|---|---|---|
| 876,639 | France | Nov. 11, 1942 |